(12) United States Patent
Souk et al.

(10) Patent No.: US 7,616,271 B2
(45) Date of Patent: Nov. 10, 2009

(54) BACKLIGHT ASSEMBLY WITH PLURAL LIGHT GUIDES SEPARATED BY PROTRUSIONS

(75) Inventors: Jun-Hyung Souk, Yongin-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 268 days.

(21) Appl. No.: 11/539,458

(22) Filed: Oct. 6, 2006

(65) Prior Publication Data

US 2007/0188677 A1   Aug. 16, 2007

(30) Foreign Application Priority Data

Feb. 13, 2006   (KR) .................. 10-2006-0013580

(51) Int. Cl.
*G02F 1/1335* (2006.01)
*F21V 7/04* (2006.01)
(52) U.S. Cl. ..................... 349/65; 349/62; 362/616
(58) Field of Classification Search ............. 349/58–71; 362/600–634
See application file for complete search history.

(56) References Cited

U.S. PATENT DOCUMENTS

| | | | | |
|---|---|---|---|---|
| 5,400,224 | A | * | 3/1995 | DuNah et al. ............... 362/616 |
| 6,580,477 | B1 | * | 6/2003 | Cho ............................. 349/65 |
| 6,768,525 | B2 | | 7/2004 | Paolini et al. |
| 6,791,636 | B2 | | 9/2004 | Paolini et al. |
| 7,490,963 | B2 | * | 2/2009 | Fang et al. ................... 362/330 |
| 2004/0130884 | A1 | * | 7/2004 | Yoo et al. ..................... 362/31 |
| 2004/0213018 | A1 | * | 10/2004 | Torihara ..................... 362/561 |

FOREIGN PATENT DOCUMENTS

| | | |
|---|---|---|
| JP | 2003-057641 | 2/2003 |
| JP | 2003-330017 | 11/2003 |
| JP | 2004-333583 | 11/2004 |
| JP | 2005-070421 | 3/2005 |
| JP | 2005-077691 | 3/2005 |
| KR | 1020030078529 | 10/2003 |
| KR | 2004-0057383 | 7/2004 |
| KR | 1020050064229 | 6/2005 |
| KR | 1020050067903 | 7/2005 |
| KR | 1020050087478 | 8/2005 |

* cited by examiner

*Primary Examiner*—David Nelms
*Assistant Examiner*—Jessica M Merlin
(74) *Attorney, Agent, or Firm*—Cantor Colburn LLP

(57) ABSTRACT

A backlight assembly and a display device having the backlight assembly include a plurality of light guiding plates, and at least one light source unit that illuminates the light guiding plates, wherein the light guiding plates are provided with protrusions that protrude from facing planes thereof so as to allow the adjacent light guiding plates to be separated from each other by a separation distance.

21 Claims, 7 Drawing Sheets

BACKLIGHT ASSEMBLY WITH PLURAL LIGHT GUIDES SEPARATED BY PROTRUSIONS

This application claims priority to a Korean Patent Application No. 10-2006-0013580, filed on Feb. 13, 2006, and all the benefits accruing therefrom under 35 U.S.C. §119, the contents of which in its entirety are herein incorporated by reference.

BACKGROUND OF THE INVENTION (a) Field of the Invention

The present invention relates to a backlight assembly, and more particularly, to a backlight assembly for supplying light to a plurality of partitioned sections of the backlight assembly and a display device having the same.

(b) Description of the Related Art

There are various types of display devices. As semiconductor technology has rapidly developed, small-sized, light-weight liquid crystal display devices with improved performance have been provided as a representative display device.

Since the liquid crystal display device has advantages including small size, light weight and low power consumption, the liquid crystal display device has been proposed as a substitute for a conventional cathode ray tube ("CRT") display device. Recently, the liquid crystal display device has been used for almost all information processing devices including small-sized devices, such as mobile phones and portable digital assistants ("PDAs"), and medium-sized or large-sized devices, such as monitors and television ("TV") sets.

In general, the liquid crystal display device includes an upper panel where a common electrode and color filters are disposed, a lower panel where thin film transistors and pixel electrodes are disposed and a liquid crystal layer interposed between the upper and lower panels. In the liquid crystal display device, different voltages are applied to the pixel electrode and common electrode to generate an electric field in the liquid crystal layer, so that alignment of liquid crystal molecules is changed. By adjusting transmittance of light passing through the liquid crystal layer, a desired image is obtained. In addition, since a non-emission type display panel is used for the liquid crystal display device, a backlight assembly is provided at a rear side of the display panel to supply light to the display panel.

In general, color filters are disposed in an inner portion of the display panel. However, since transmittance of the color filters is low, a large amount of light emitted from the backlight assembly is lost. Therefore, in order to secure a desired brightness of the display panel, the light intensity of the backlight assembly must increase, thus increasing power consumption. In addition, the color filters are more expensive than other components of the liquid crystal display device, and thus may be a major factor in increasing production costs of the liquid crystal display.

In order to solve these problems, a technique for implementing a full color image without the color filters has been proposed. The technique includes sequentially turning on and off red, green and blue light source units in a predetermined time interval. However, in this case, a response speed of the liquid crystals is low, such that a whole image cannot be driven in one frame. In order to solve this problem, a technique for partitioning the display panel into a plurality of sections and partitioning the backlight assembly for supplying light to the display panel has been implemented.

However, in this technique, the light may not be separately supplied to the sections. In addition, the light may be leaked into adjacent sections, so that unnecessary light and mixed light may be supplied. In addition, in an image displayed on the display panel, the partitioned sections or the boundaries between the partitioned sections may be recognized in viewing the image. Due to these phenomena, display performance and image quality deteriorate.

BRIEF SUMMARY OF THE INVENTION

The present invention provides a backlight assembly capable of supplying light in various colors by partitioning the backlight assembly into a plurality of sections and capable of minimizing dark portions and improving brightness uniformity of an image.

The present invention also provides a display device having the backlight assembly capable of displaying a full color image without color filters and improving uniformity of image quality.

According to an exemplary embodiment of the present invention, a backlight assembly includes: a plurality of light guiding plates; and at least one light source unit that illuminates the light guiding plates, wherein the light guiding plates are provided with protrusions that protrude from facing planes thereof so as to allow the adjacent light guiding plates to be separated from each other by a separation distance.

In the above exemplary embodiment of the present invention, the light source unit may sequentially supply three primary colors of light to each of the light guiding plates.

The light source unit may include a plurality of light emitting diodes.

Each of the light guiding plates may include a light entering plane that is illuminated by the light source unit and is perpendicular to the facing plane, a light emitting plane that is perpendicular to the light entering plane and the facing plane, and a light reflecting plane that is opposite to the light emitting plane, and each of the light guiding plates may be disposed to extend in a direction perpendicular to the light entering plane.

The protrusions may protrude toward the adjacent light guiding plate, and one surface of each protrusion may be aligned in a same plane as the light emitting planes.

An end portion of each protrusion may be in contact with an end portion of a protrusion protruding from the facing plane of the adjacent light guiding plate.

An end portion of each protrusion may be in contact with the facing plane of the adjacent light guiding plate.

The backlight assembly may further include a reflecting member that faces the light reflecting plane of the light guiding plate.

The backlight assembly may further include an optical member that faces the light emitting plane of the light guiding plate.

The optical member may include a transparent sheet that is disposed to be most proximate to the light guiding plate.

A plurality of light source units may be disposed in a partitioned manner corresponding to partitioning of the light guiding plates.

Accordingly, by partitioning the backlight assembly into a plurality of sections, it is possible to provide a stable supply of light in various colors. In addition, it is possible to minimize dark portions and to improve uniformity of brightness of an image.

According to another exemplary embodiment of the present invention, a display device includes: a panel assembly for displaying an image; a plurality of light guiding plates; at least one light source unit that illuminates the light guiding plates; and containing members that contain the light guiding plates and the light source units, wherein the light guiding plates are provided with protrusions that protrude from facing planes of adjacent light guiding plates.

In the above exemplary embodiment of the present invention, the light source unit may sequentially supply three primary colors of light to each of the light guiding plates.

The light source unit may include a plurality of light emitting diodes.

Each of the light guiding plates may include a light entering plane that is illuminated by the light source unit and is perpendicular to the facing plane, a light emitting plane that is perpendicular to the light entering plane and the facing plane, and a light reflecting plane that is opposite to the light emitting plane, and each of the light guiding plates may be disposed to extend in a direction perpendicular to the light entering plane.

The protrusions may protrude toward the adjacent light guiding plate, and one surface of each protrusion is aligned in a same plane as the light emitting planes.

An end portion of each protrusion may be in contact with an end portion of a protrusion protruding from the facing plane of the adjacent light guiding plate.

An end portion of each protrusion may be in contact with the facing plane of the adjacent light guiding plate.

The display device may further include an optical member that faces the light emitting plane of the light guiding plate, wherein the optical member includes a transparent sheet that is disposed to be most proximate to the light guiding plate.

A plurality of light source units may be disposed in a partitioned manner.

Accordingly, it is possible to display a full color image without color filters and to improve uniformity of an image quality.

BRIEF DESCRIPTION OF THE DRAWINGS

The above and other features and advantages of the present invention will become more apparent by describing in more detail exemplary embodiments thereof with reference to the attached drawings, in which.

DETAILED DESCRIPTION OF THE INVENTION

Figure 1:
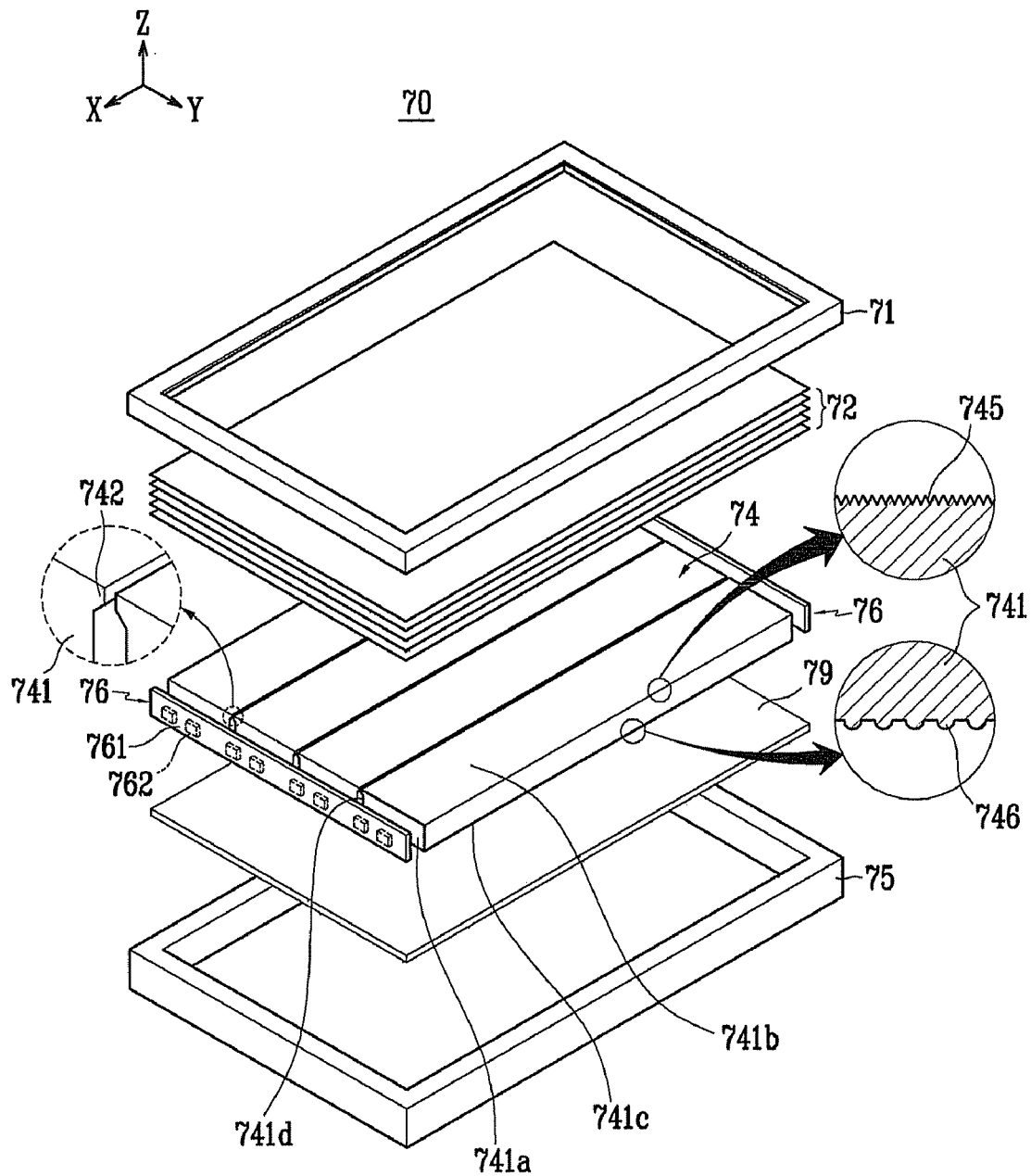
FIG. 1 is a perspective exploded view showing a backlight assembly according to an exemplary embodiment of the present invention.

The present invention will now be described more fully hereinafter with reference to the accompanying drawings, in which exemplary embodiments of the present invention are shown. The present invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described Moreover, sharp angles that are illustrated may be rounded.

Thus, the regions illustrated in the figures are schematic in nature and their shapes are not intended to illustrate the precise shape of a region and are not intended to limit the scope of the present invention.

For clarity of description of the present invention, description of components unrelated to the present invention is omitted. In addition, all necessary components of the present invention will be representatively described with respect to a first exemplary embodiment, and only different elements and construction will be described in the remaining exemplary embodiments.

As shown in FIG. 1, a backlight assembly 70 includes a plurality of light guiding plates 74, a light source unit 76, a reflecting member 79, optical members 72, and containing members 71 and 75 for containing these components.

The containing members 71 and 75 include a first containing member 75, which contains the light guiding plates 74, the light source unit 76, the reflecting member 79, and the optical members 72, and a second containing member 71 that is assembled with the first containing member 75 to fix these components.

The plurality of light guiding plates 74 are disposed in a partitioned manner (e.g., as if a single light guide plate was segregated into a plurality of separated light guide plates). Each of the light guiding plates 74 includes a light guiding plate body 741 and protrusions 742 that protrude from the light guiding plate body 741. More specifically, the protrusions 742 protrude from facing planes 741d of adjacent light guiding plate bodies 741. Each light guiding plate body 741 includes a light entering plane 741a that is illuminated by the light source unit 76, a light emitting plane 741b that is perpendicular to the light entering plane 741a, and a light reflecting plane 741c that is opposite the light emitting plane 741b. Here, the light entering planes 741a, the light emitting planes 741b, and the facing planes 741d are disposed to be perpendicular to each other. Each of the light guiding plates 74 is disposed to extend in a direction perpendicular to the light entering plane 741a.

The light emitting from the light source unit 76 is incident on the light entering plane 741a of the light guiding plate body 741. While the incident light propagates to an inner portion of the light guiding plate body 741, the light is emitted substantially uniformly from the light emitting plane 741b of the light guiding plate body 741 in an upward direction thereof, as illustrated in FIG. 1. The light that propagates in a downward direction of the light guiding plate body 741 is partially scattered and reflected. The light passing through the light reflecting plane 741c is reflected by the reflecting member 79, so that the light reflected from the reflecting member 79 is also emitted from the light emitting plane 741b.

In addition, as shown in FIG. 1, each of the light guiding plates 74 may have a pair of opposite light entering planes 741a, and two light source units 76 may be disposed to face both sides of the light guiding plates 74 so as to illuminate the light entering planes 741a. However, the present invention is not limited thereto. Alternatively, each of the light guiding plates 74 may have only one light entering plane 741a at one side and one light source unit 76 may be disposed to face the one side of the light guiding plates 74 so as to illuminate the light entering plane 741a. In this case, the light guiding plates may be formed to have a shape of a wedge.

As shown in the enlarged circle of FIG. 1, a prism pattern 745 is formed on the light emitting plane 741b of the light guiding plate 74, and a dot pattern 746 (e.g., domes or hemispheres) is formed on the light reflecting plane 741c of the light guiding plate 74.

The dot pattern 746 has a function of scattering the light passing through the inner portion of the light guiding plate 74 to form a uniformly dispersed light. Therefore, it is possible to improve uniformity of the light emitted from the light emitting plane 741b. The prism pattern 745 has a function of improving brightness of the light emitting from the light emitting plane 741b.

The light source unit 76 sequentially illuminates the light entering planes 741a of the light guiding plates 74 with light beams in three primary colors. The three primary colors may be a set of red, green and blue or a set of cyan, magenta and yellow. In addition to the three primary colors, white or the like may be added. The light source unit 76 includes printed circuit boards ("PCBs") 761 and a plurality of light emitting diodes 762 mounted on the PCBs 761. More specifically, one side plane of the light guiding plates 74 is provided with one PCB 761 where the light emitting diodes 762 are mounted. Therefore, two PCBs 761 are disposed on the two side planes of the light guiding plates 74.

The light source unit 76 sequentially illuminates the plurality of partitioned light guiding plates 74 with light beams in the three colors in a predetermined period. Since the light guiding plates 74 are separated from each other by the protrusions 742 extending from corresponding light guiding plates 74, the light beams can separately propagate the partitioned light guiding plates 74. In this manner, due to the separation between the light guiding plates 74, undesired propagation of the light guided by one light guiding plate 74 into the adjacent light guiding plates 74 can be suppressed. More specifically, due to a difference between reflective indexes of the light guiding plates 74 and air between adjacent light guiding plates 74, the light that is emitted from the light source unit 76 and is incident on the light entering planes 741a is totally reflected by the facing planes 741d, so that the propagation of the light into the adjacent light guiding plates 74 is suppressed. As a result, it is possible to prevent light from being unnecessarily supplied to undesired portions and to minimize mixing of light in undesired colors.

Figure 2:
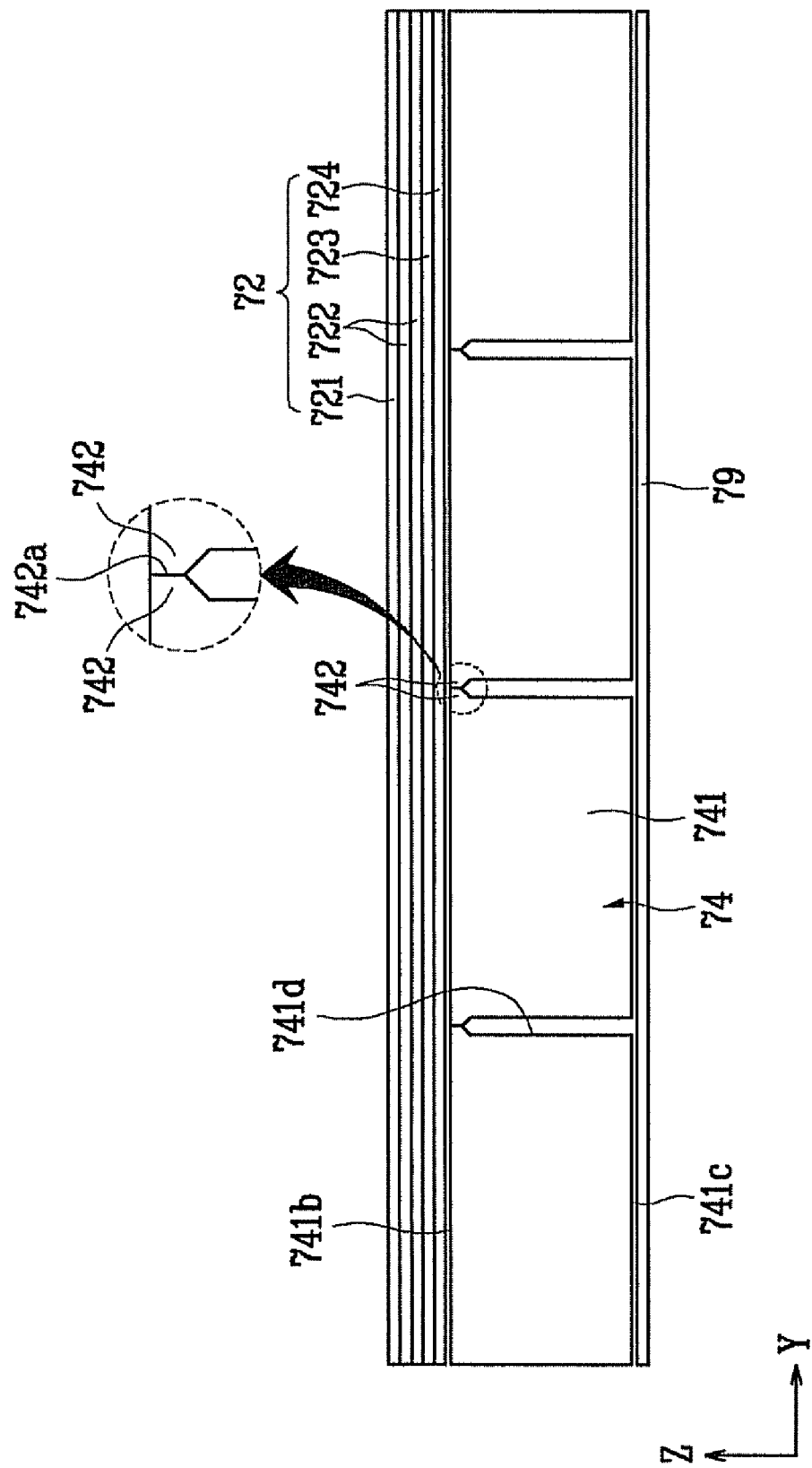
FIG. 2 is a side elevation view showing an arrangement of light guiding plates, optical members, and a reflecting member in the backlight assembly of FIG. 1 according to the exemplary embodiment of the present invention.

FIG. 2 shows an arrangement of light guiding plates 74, optical members 72, and a reflecting member 79.

As shown in FIG. 2, the protrusions 742 of the light guiding plates 74 protrude from corners that are formed by the light emitting plane 741b and the facing plane 741d thereof and protrude from the facing plane 741d in a direction (Y axis direction) perpendicular to the facing plane 741d. End portions 742a of the protrusions 742 of adjacent light guiding plates 74 are in contact with each other. Therefore, the facing planes 741d of adjacent light guiding plates 74 are separated from each other by the end portions 742a of the protrusions 742. Namely, the light guiding plates 74 are separated by a predetermined distance from each other (e.g., a length of corresponding abutting protrusions extending from respective facing planes 741d. Due to a difference between reflective indexes of the light guiding plates 74 and air, light is totally reflected by the facing planes 741d. Also, one surface of each protrusion 742 is aligned in a same plane as the light emitting plane 741b. The reflecting member 79 is disposed to face the light reflecting planes 741c of the light guiding plates 74. The light that is reflected toward the reflecting member 79 by the light reflecting planes 741c of the light guiding plates 74 is reflected again back toward the light guiding plates 74 by the reflecting member 79. Therefore, loss of light is reduced and diffusion of the light is promoted, so that uniformity of the light emitting from the light emitting planes 741b of the light guiding plates 74 is improved.

The optical members 72 include a diffuser sheet 723, a plurality of prism sheets 722, a protective sheet 721 and a transparent sheet 724. The diffuser sheet 723 diffuses light preventing only partial distribution of light, thus improving uniformity of the light. The plurality of prism sheets 722 directs the light passing through the diffuser sheet 723 in the vertical direction, so that brightness of the light is also improved. The protective sheet 721 protects the diffuser and prism sheets 723 and 722 from dust, scratches, external impact and external contaminants. The transparent sheet 724 is disposed under the diffuser sheet 723, that is, closest to the light guiding plates 74. The separation interval between the diffuser sheet 723 and the light guiding plates 74 increases Due to the transparent sheet 724 therebetween, so that recognition of boundaries between the partitioned light guiding plates 74 separated from each other can be minimized.

In the above construction, the partitioned light guiding plates 74 are separated from each other by the protrusions 742. Due to a difference between reflective indexes of the light guiding plates 74 and air, the light that is emitted from the light source unit 76 and is incident on the light entering planes 741a is totally reflected by the facing planes 741d of the light guiding plates 74. Therefore, undesired propagation of the light into adjacent light guiding plates 74 can be suppressed, thus preventing light from being unnecessarily supplied to undesired portions and minimizing the mixing of light in undesired colors.

As shown in FIG. 2, since the protrusions 742 are disposed to be close to the light emitting planes 741b, recognition of the boundaries between the partitioned light guiding plates 74 caused from light partially propagating from the protrusions 742 can be minimized.

Figure 3:
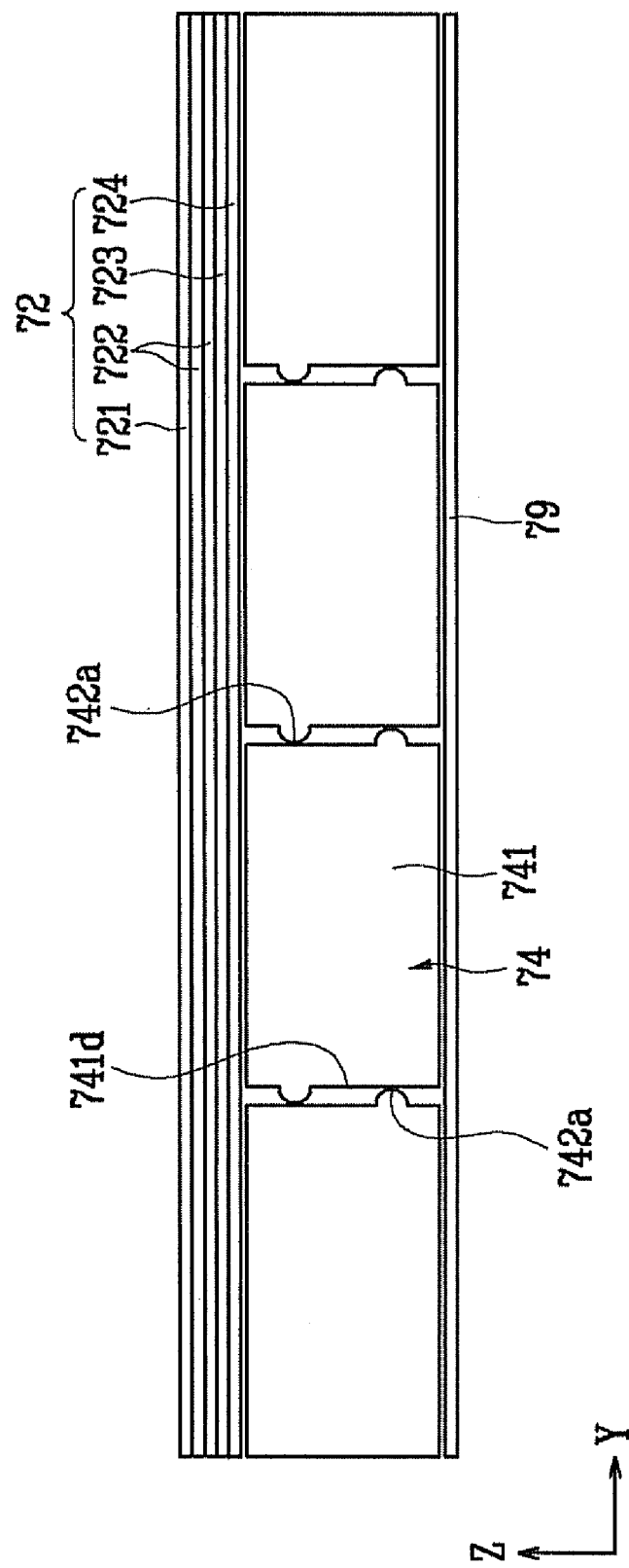
FIG. 3 is a side elevation view showing an arrangement of light guiding plates, optical members, and a reflecting member in a backlight assembly according to another exemplary embodiment of the present invention.

Now, a backlight assembly 70 according to another exemplary embodiment of the present invention will be described with reference to FIG. 3. FIG. 3 shows an arrangement of light guiding plates 74, optical members 72 and a reflecting member 79.

As shown in FIG. 3, end portions 742a of protrusions 742 of the light guiding plate 74 are in contact with facing planes 741d of adjacent light guiding plates 74. Unlike the exemplary embodiment described above, the protrusions 742 that protrude from the light guiding plates 74 are not in contact with each other. In addition, the end portions 742a of the protrusions 742 have the shape of a semi-sphere or hemisphere.

In the construction illustrated in FIG. 3, it is possible to prevent breakage of the protrusions 742 caused from collisions thereof. In addition, it is possible to prevent defects caused from particles originated from partial breakage of the protrusions 742. Therefore, it is possible to maintain a stable separation interval between the adjacent light guiding plates 74.

Figure 4:
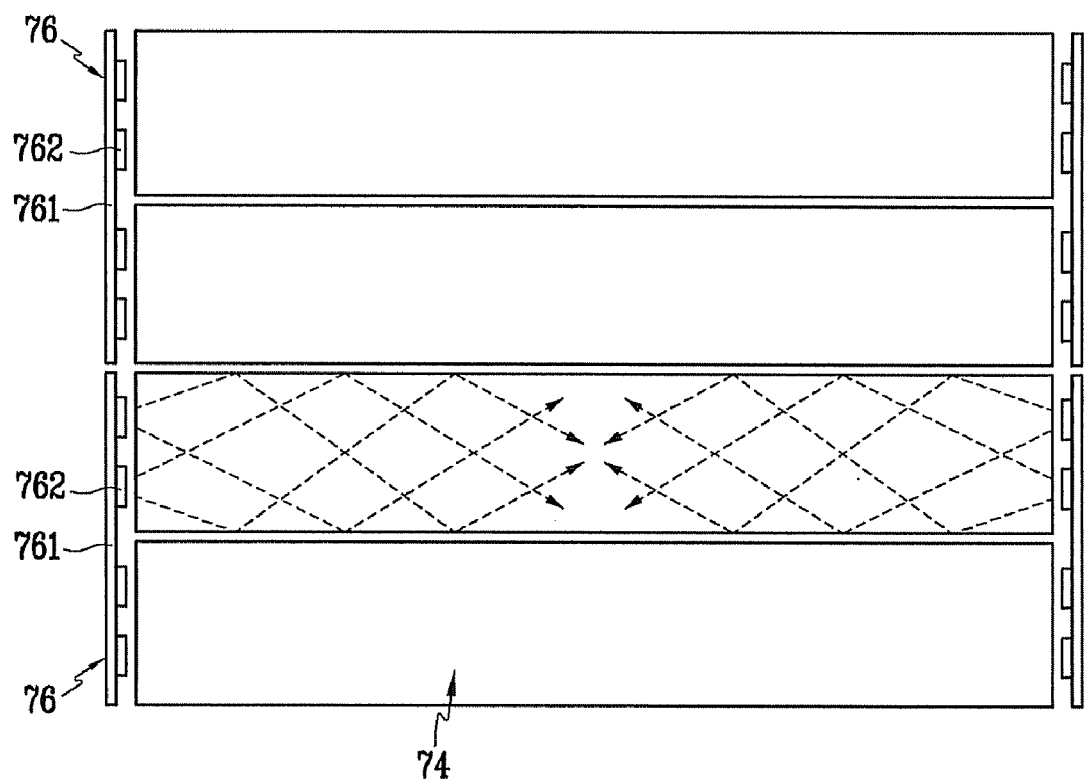
FIG. 4 is a plan view showing an arrangement of light guiding plates and light source units in a backlight assembly according to yet another exemplary embodiment of the present invention.

Now, a backlight assembly 70 according to yet another exemplary embodiment of the present invention will be described with reference to FIG. 4. FIG. 4 shows an arrangement of light guiding plates 74 and light source units 76.

As shown in FIG. 4, a plurality of light source units 76 may be disposed on sides of the light guiding plates 74. Namely, a plurality of printed circuit boards 761 where a plurality of light emitting diodes 762 are mounted are disposed on the sides of the light guiding plates 74.

In the above construction, the plurality of partitioned light guiding plates 74 can be illuminated by the plurality of corresponding light source units 76. The light that emits from the light guiding plates 74, illuminated by the light source units 76, can be easily adjusted. Therefore, it is possible to adjust the light emitted from the backlight assembly 70 to be uniform.

Now, a display device 100 having the backlight assembly 70 according to still another exemplary embodiment of the present invention will be described with reference to the accompanying drawings, in particular with respect to FIG. 5. The display device 100 according to this exemplary embodiment is an example of the present invention, but the present invention is not limited thereto.

Figure 5:
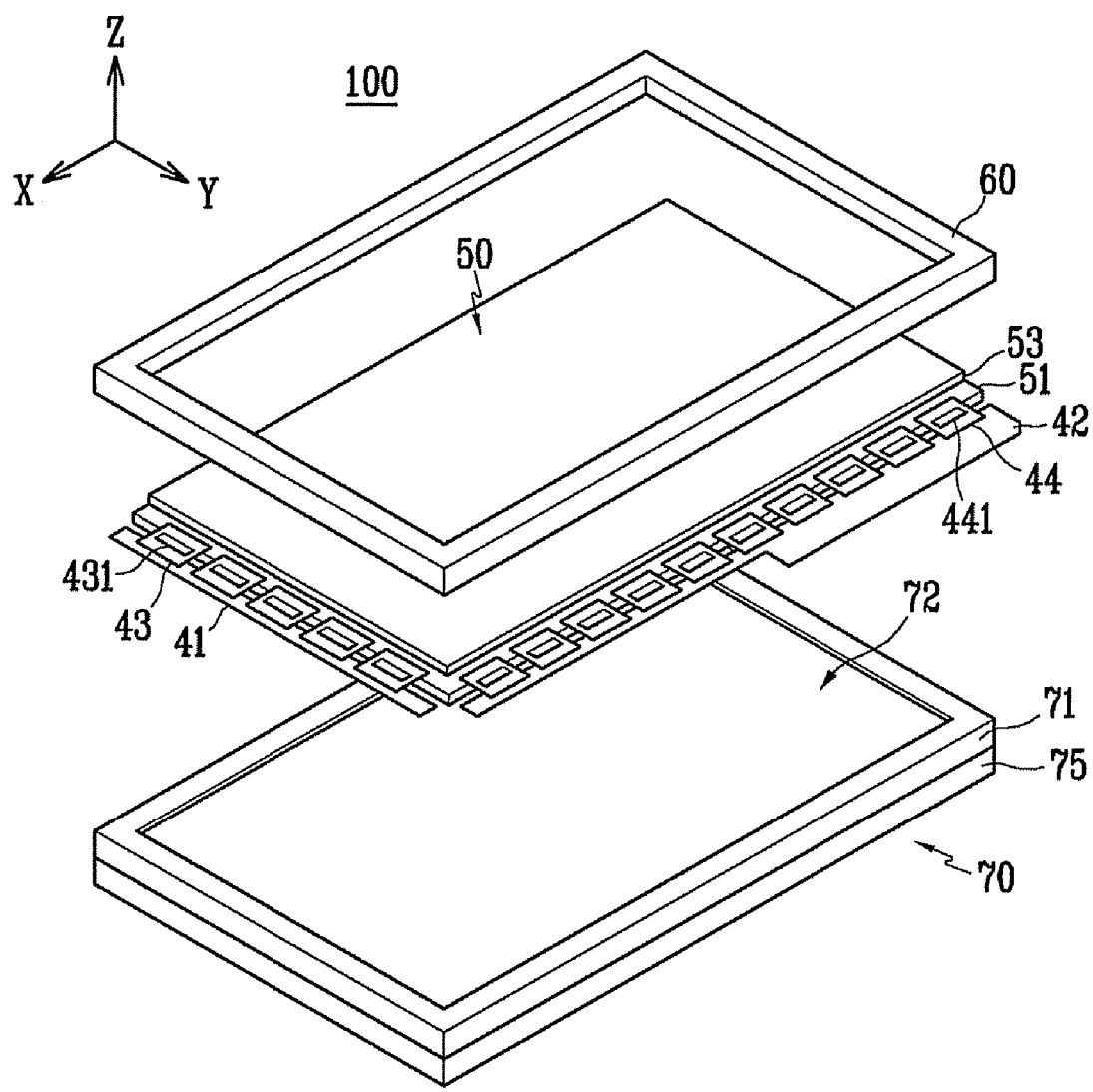
FIG. 5 is an exploded perspective view showing a display device having the backlight assembly of FIG. 1 according to an exemplary embodiment of the present invention.

FIG. 5 shows the display device 100 having the exemplary embodiment of the backlight assembly 70 shown in FIG. 1 according to the present invention.

In the accompanying drawings, a liquid crystal display panel is exemplified as the panel assembly 50 used for the display device 100. However, the liquid crystal display panel is only an example of the present invention and the present invention is not limited thereto. Alternatively, other non-emission type display panels may be used for the display device according to the present invention.

As shown in FIG. 5, the display device 100 includes the backlight assembly 70 for supplying light to the panel assembly and the panel assembly 50 for displaying an image by using the supplied light. In addition, the display device 100 includes a third containing member 60 for containing and fixing the panel assembly 50 in the backlight assembly 70. As needed, the display device 100 may include other components.

By such a construction, the backlight assembly 70 shown in FIG. 1 sequentially illuminates the panel assembly 50 with light beams in three primary colors in a predetermined period. Namely, one frame corresponding to one screen is formed by sequentially illuminating the panel assembly 50 with light beams in the three primary colors. Therefore, although color filters are absent in an inner portion of the panel assembly 50, a full color image can be implemented. In addition, the backlight assembly 70 is partitioned into a plurality of sections that are separately supplied with the light. Therefore, it is possible to minimize a time interval taken to form one frame in the panel assembly 50. Namely, a full color image can be displayed without color filters, and the plurality of partitioned light guiding plates 74 are separately supplied with light, thus making it is possible to reduce a time interval taken to form one frame corresponding to one screen.

In addition, in the backlight assembly 70, the propagation of the light into adjacent light guiding plates 74 is suppressed since each of the plurality of partitioned light guiding plates 74 shown in FIG. 1 are stably maintained so as to remain separated from each other. As a result, it is possible to prevent light from being unnecessarily supplied to undesired portions and to minimize mixing of light in undesired colors.

In addition, in the image displayed by the panel assembly 50, recognition of the partitioned sections or the boundaries between the partitioned sections (e.g., between adjacent light guiding plates 74) can be minimized. As a result, it is possible to improve display performance and image quality.

The panel assembly 50 includes a first panel 51, a second panel 53 facing the first panel 51 and a liquid crystal layer 52 (shown in FIG. 7) interposed between the first and second panels 51 and 53. Here, the first and second panels 51 and 53 are front and rear substrates, respectively. The second panel 53 is designed to be smaller than the first panel 51, as illustrated in FIG. 5.

In addition, the display device 100 further includes printed circuit boards ("PCBs") 41 and 42 electrically connected to the panel assembly 50 so as to transmit driving signals and drive integrated circuit ("IC") chip packages 43 and 44. As an example of the drive IC chip packages 43 and 44, chip on film ("COF") or tape carrier package ("TCP") may be used. The drive IC chip packages include a gate drive IC chip package 43 and a data drive IC chip package 44. The gate drive IC chip package 43 is attached on one side edge of a first panel 51 and includes IC chips 431 constituting a gate driver 400 shown in FIG. 6. The data drive IC chip package 44 is attached on another side edge of the first panel 51 and includes IC chips 441 constituting a data driver 500 shown in FIG. 6 and a grayscale voltage generator 800 shown in FIG. 6.

In addition, although not shown in FIG. 5, a control circuit board is disposed on a rear surface of the first containing member 75 to be connected to the PCB 42. The control circuit board includes a signal controller 600 shown in FIG. 6 for applying signals required for displaying an image on the panel assembly 50.

The panel assembly 50, the backlight assembly 70 and the construction thereof for driving the panel assembly 50 and the backlight assembly 70 will be explained with reference to FIGS. 6 and 7.

Figure 6:
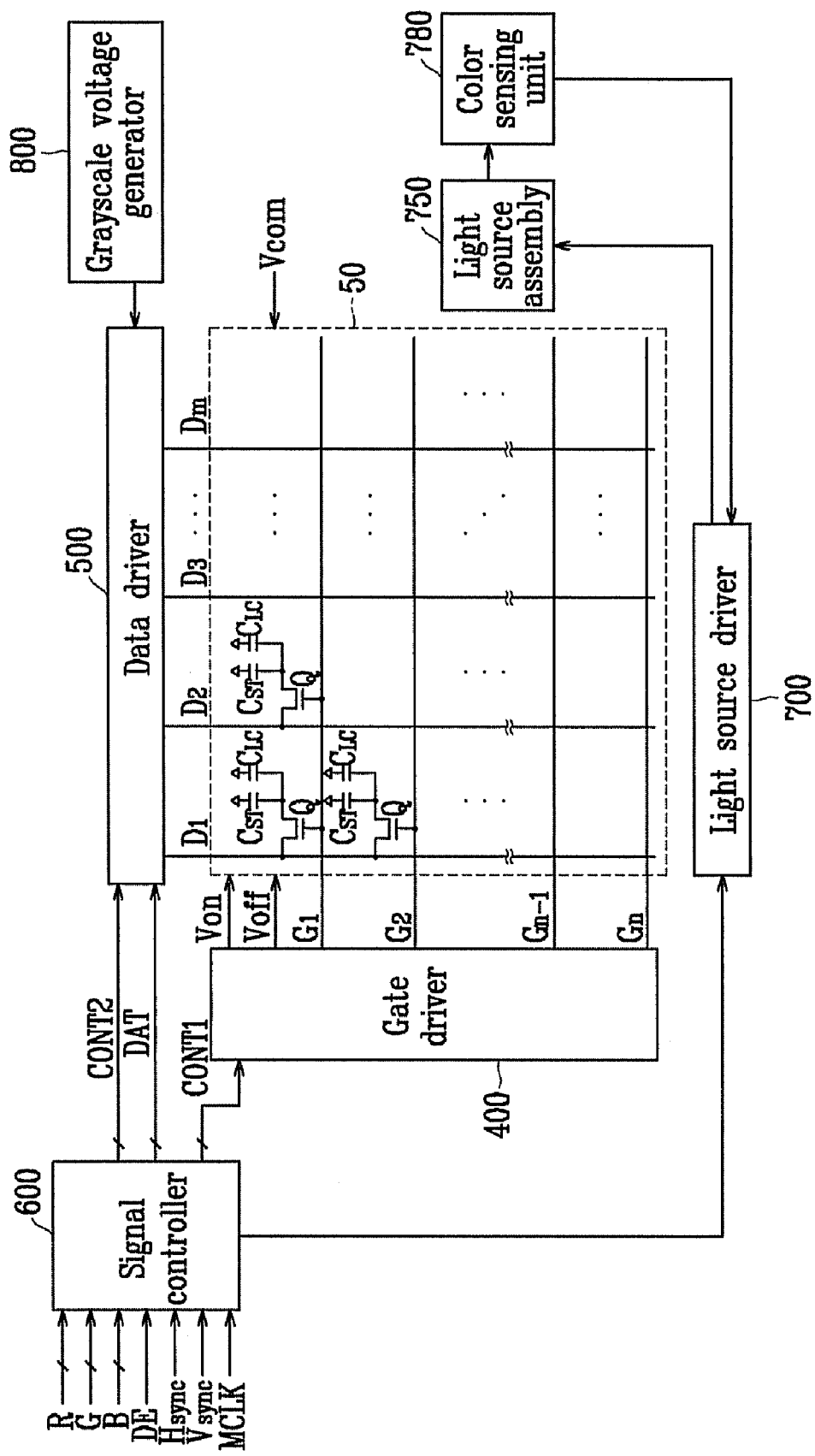
FIG. 6 is a block diagram showing a construction of a panel assembly and drivers for driving the panel assembly included in the display device of FIG. 5
Figure 7:
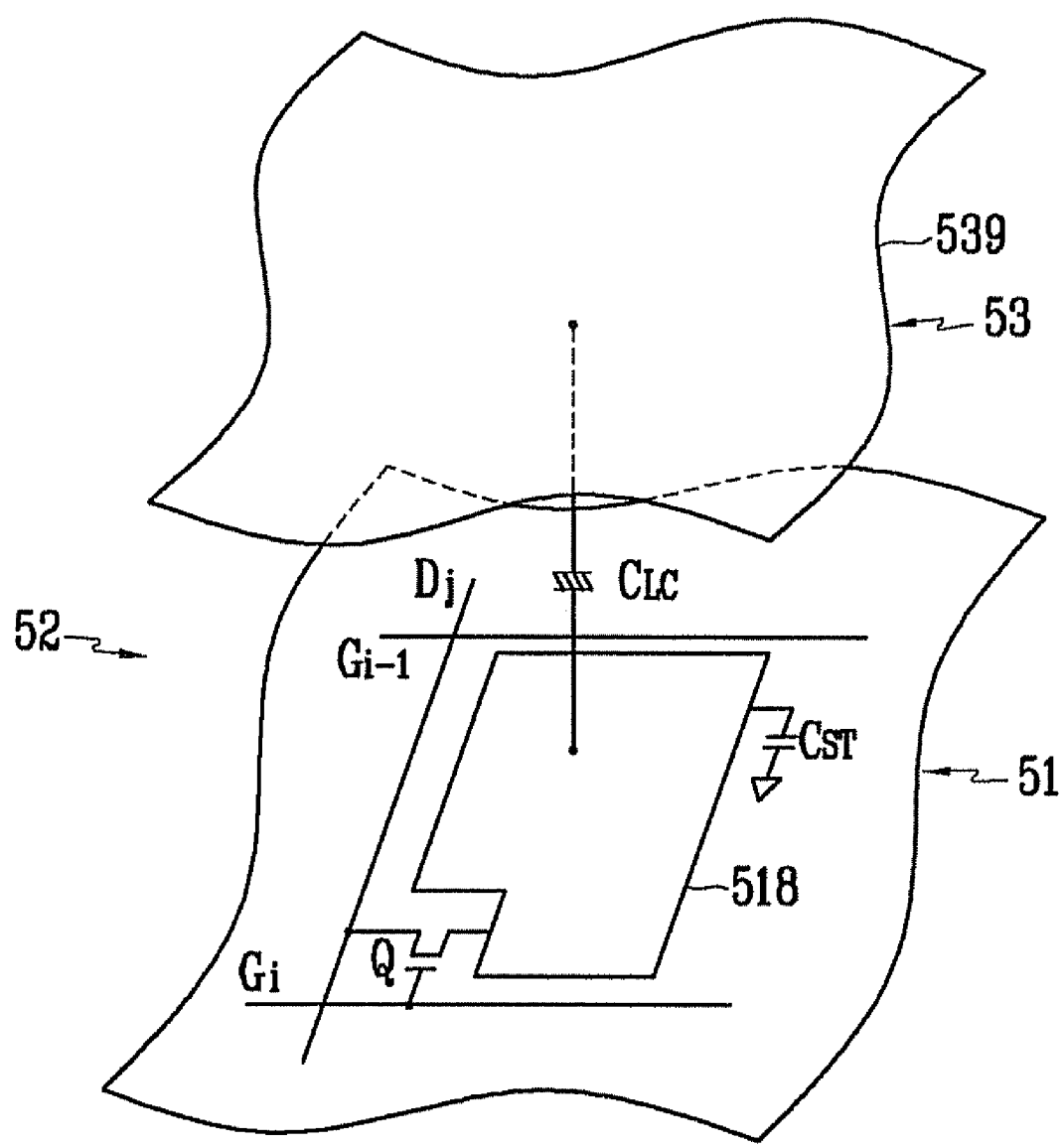
FIG. 7 is an equivalent circuit schematic diagram showing a pixel in the panel assembly of FIG. 6.

As shown in FIGS. 6 and 7, a first panel 51 includes a plurality of signal lines $G_1$ to $G_n$ and $D_1$ to $D_m$, and the first panel 51 and the second panel 53 are connected to the signal lines $G_1$ to $G_n$ and $D_1$ to $D_m$, and include a plurality of pixels arrayed in a matrix.

The signal lines $G_1$ to $G_n$ and $D_1$ to $D_m$ include a plurality of gate lines $G_1$ to $G_n$ for delivering gate signals (also called "scanning signals) and a plurality of data lines $D_1$ to $D_m$ for delivering data signals. The gate lines $G_1$ to $G_n$ extend in a row direction and are substantially parallel to each other, and the data lines $D_1$ to $D_m$ extend in a column direction and are substantially parallel to each other.

Each pixel includes a switching element Q connected to the signal lines $G_1$ to $G_n$ and $D_1$ to $D_m$, a liquid crystal capacitor $C_{LC}$ connected to the switching element Q, and a storage capacitor $C_{ST}$. If necessary, the storage capacitor $C_{ST}$ may be omitted.

The switching element Q is a kind of thin film transistor and is formed on the first panel 51. The thin film transistor is a device having three terminals, a control terminal of which is connected to the gate lines $G_1$ to $G_n$, an input terminal of which is connected to the data lines $D_1$ to $D_m$, and an output terminal of which is connected to the liquid crystal capacitor $C_{LC}$ and the storage capacitor $C_{ST}$.

The signal controller 600 controls operations of the gate driver 400, the data driver 500 and a light source driver 700. A gate driver 400 applies gate signals that are composed of a gate ON voltage $V_{on}$ and a gate OFF voltage $V_{off}$ to the gate lines $G_1$ to $G_n$, and a data driver 500 applies a data voltage to the data lines $D_1$ to $D_m$. The grayscale voltage generator 800 generates two sets of grayscale voltages related to transmissivity of the pixels, and then delivers the two sets of grayscale voltages to the data driver 500 as the data voltage. One set has a positive value in relation to a common voltage $V_{com}$, and the other set has a negative value.

The light source driver 700 controls operations of a light source assembly 750. The light source assembly 750 includes a plurality of light source units 76 (shown in FIG. 1) and cables for electrically connecting the light source units 76 to the light source driver 700. As needed, the light source assembly 750 may include other components. In addition, a color sensing unit 780 senses colors of the light that is illuminated to the panel assembly 50 and transmits information required for implementing uniform color and brightness for the panel assembly 50 to the light source driver 700. In a case where the plurality of light source units 76 for separately illuminating the plurality of partitioned light guiding plates 74 (shown in FIG. 1) are separately driven, a plurality of color sensing units 780 may be provided to transmit information required for the light source units 76 to the separately driven light source units 76.

As shown in FIG. 7, the liquid crystal capacitor $C_{LC}$ has two electrodes, that is, a pixel electrode 518 on the first panel 51 and a common electrode 539 on the second panel 53, and a liquid layer 52 interposed between the two electrodes 518 and 539 functions as a dielectric layer. The pixel electrode 518 is connected to the switching element Q, and the common electrode 539 is formed on the second panel 53 and is applied with the common voltage $V_{com}$. Different from FIG. 7, the common electrode 539 may be formed on the first panel 51, and at this point, any one of the two electrodes 518 and 539 may be formed in the shape of a line or a bar.

The storage capacitor $C_{ST}$, auxiliary to the liquid crystal capacitor $C_{LC}$, is composed of a separate signal line (not shown) provided on the first panel 51 and the pixel electrode 518 using an insulation layer as a medium therebetween, and a fixed voltage such as the common voltage $V_{com}$ is applied to the separate signal line. However, the storage capacitor $C_{ST}$ may be composed of the pixel electrode 518 and the gate lines $G_1$ to $G_n$ using an insulation layer as a medium therebetween.

A polarizer (not shown) for polarizing light is attached to the outside of at least one of the two panels 51 and 53 of the panel assembly 50. With such a construction, if a switching element, that is, a thin film transistor is turned ON, an electric field is formed between the pixel electrode 518 and the common electrode 539. Such an electric field changes a liquid crystal array alignment of the liquid crystal layer 52 formed between the first panel 51 and the second panel 53, so that desired images can be obtained by adjusting light illuminated from the backlight assembly according to the changed light transmission level.

As described above, in a backlight assembly according to the present invention, the backlight assembly can be partitioned into a plurality of sections, so that light in various colors can be stably and reliably supplied to the partitioned sections. In addition, it is possible to minimize dark portions caused by the partitioned sections and to improve uniformity of brightness of an image.

Namely, a plurality of partitioned light guiding plates are substantially separated from each other by the protrusions. Due to a difference between reflective indexes of the light guiding plates and air, the light that emits from the light source unit and is incident on the light entering planes is totally reflected by the facing planes. Therefore, undesired propagation of the light into adjacent light guiding plates can be suppressed, thus preventing light from being unnecessarily supplied to undesired portions and minimizing the mixing of light in undesired colors.

In addition, since the protrusions are disposed to be close to the light emitting planes defining the partitioned light guiding plates, recognition of the boundaries between the partitioned light guiding plates caused from light partially propagating from the protrusions can be minimized.

In addition, the end portions of the protrusions may have the shape of a semi-sphere or hemisphere (e.g., dome shaped), and the end portions thereof are directly in contact with the facing planes of adjacent light guiding plates, so that it is possible to prevent breakage of the protrusions or the end portions thereof caused from collisions between the end portions of the protrusions. Therefore, it is possible to maintain a stable separation interval between the adjacent light guiding plates.

In a backlight assembly according to the present invention, the plurality of light source units for separately illuminating the plurality of partitioned light guiding plates are separately driven, so that it is possible to partially and finely adjust the light illuminated by the light source units and emitted from the light guiding plates. Therefore, it is possible to adjust the light emitted from the backlight assembly to be uniform.

In a display device according to the present invention, the aforementioned backlight assembly is provided, so that a full color image can be displayed. In addition, it is possible to improve uniformity of image quality.

Namely, in the backlight assembly, one frame corresponding to one screen is formed by sequentially illuminating the panel assembly with light beams in three primary colors. Therefore, although color filters are absent in an inner portion of the panel assembly, a full color image can still be obtained.

In addition, the backlight assembly is partitioned into a plurality of sections that are each separately supplied with the light. Therefore, it is possible to minimize a time interval taken to form one frame in the panel assembly.

In addition, in the backlight assembly, since the plurality of partitioned light guiding plates can be stably and reliably separated from each other, propagation of the light into adjacent light guiding plates can be suppressed. As a result, it is possible to prevent light from being unnecessarily supplied to undesired portions and minimize mixing of light in undesired colors.

In addition, in the image displayed by the panel assembly, recognition of the partitioned sections or the boundaries between the partitioned sections can be minimized. As a result, it is possible to improve display performance and image quality.

Although the exemplary embodiments of the present invention have been described, the present invention is not limited to the exemplary embodiments, but may be modified in various forms without departing from the scope of the appended claims, the detailed description and the accompanying drawings of the present invention. Therefore, it is natural that such modifications belong to the scope of the present invention.

What is claimed is:

1. A backlight assembly comprising:
   a plurality of light guiding plates, each of the light guiding plates includes a light emitting plane perpendicular to a light entering plane, a light reflecting plane opposite the light emitting plane, and a facing plane, the light entering plane, the light emitting plane, and the facing plane are disposed to be perpendicular to each other; and
   at least one light source unit that illuminates the light guiding plates,
   wherein each of the light guiding plates includes at least one protrusion that protrudes from the facing plane thereof so as to allow adjacent light guiding plates to be separated from each other by a separation distance, light from the light source is incident on the light entering plane and emitted from the light emitting plane, and each of the light guiding plates is disposed to extend in a direction perpendicular to the light entering plane.

2. The backlight assembly of claim 1, wherein the light source unit sequentially supplies three primary colors of light to each of the light guiding plates.

3. The backlight assembly of claim 2, wherein the light source unit includes a plurality of light emitting diodes.

4. The backlight assembly of claim 1, wherein the protrusions protrude toward the adjacent light guiding plate, and one surface of each protrusion is aligned in a same plane as the light emitting plane.

5. The backlight assembly of claim 4, wherein an end portion of the protrusion is in contact with an end portion of another protrusion protruding from the facing plane of the adjacent light guiding plate.

6. The backlight assembly of claim 1, wherein an end portion of the protrusion is in contact with the facing plane of the adjacent light guiding plate.

7. The backlight assembly of claim 6, wherein each protrusion is dome shaped.

8. The backlight assembly of claim 1, further comprising a reflecting member that faces the light reflecting plane of the light guiding plate.

9. The backlight assembly of claim 1, further comprising an optical member that faces the light emitting plane of the light guiding plate.

10. The backlight assembly of claim 9, wherein the optical member includes a transparent sheet that is disposed to be closest to the light guiding plate.

11. The backlight assembly of claim 1, wherein a plurality of light source units are disposed in a partitioned manner corresponding to partitioning of the light guiding plates.

12. The backlight assembly of claim 1, further comprising containing members that contain the light guiding plates and the light source units.

13. A display device comprising:
    a panel assembly for displaying an image;
    a plurality of light guiding plates, each of the light guiding plates includes a light emitting plane perpendicular to a light entering plane, a light reflecting plane opposite the light emitting plane, and a facing plane, the light entering plane, the light emitting plane, and the facing plane are disposed to be perpendicular to each other;
    at least one light source unit that illuminates the light guiding plates; and
    containing members that contain the light guiding plates and the light source units,
    wherein each of the light guiding plates includes at least one protrusion that protrudes from the facing plane of adjacent light guiding plates, light from the light source is incident on the light entering plane and emitted from the light emitting plane, and each of the light guiding plates is disposed to extend in a direction perpendicular to the light entering plane.

14. The display device of claim 13, wherein the light source unit sequentially supplies three primary colors of light to each of the light guiding plates.

15. The display device of claim 14, wherein the light source unit includes a plurality of light emitting diodes.

16. The display device of claim 13, wherein the protrusions protrude toward the adjacent light guiding plate, and one surface of each protrusion is aligned in a same plane as the light emitting plane.

17. The display device of claim 16, wherein an end portion of the protrusion is in contact with an end portion of another protrusion protruding from the facing plane of the adjacent light guiding plate.

18. The display device of claim 13, wherein an end portion of the protrusion is in contact with the facing plane of the adjacent light guiding plate.

19. The display device of claim 18, wherein each protrusion is dome shaped.

20. The display device of claim 13, further comprising an optical member that faces the light emitting plane of the light guiding plate,
    wherein the optical member includes a transparent sheet that is disposed to be closest to the light guiding plate.

21. The display device of claim 13, wherein a plurality of light source units are disposed in a partitioned manner corresponding to partitioning of the light guiding plates.

* * * * *